Jan. 18, 1966 D. R. SPENCER 3,230,509

MULTIPLE CIRCUIT DATA TRANSMISSION CONTROL

Filed June 11, 1962 3 Sheets-Sheet 1

INVENTOR
DANA R. SPENCER
BY Melvin P. Williams
ATTORNEY

M TYPE CONTROL

N TYPE CONTROL

Jan. 18, 1966 D. R. SPENCER 3,230,509

MULTIPLE CIRCUIT DATA TRANSMISSION CONTROL

Filed June 11, 1962 3 Sheets-Sheet 3

TIMING

United States Patent Office 3,230,509
Patented Jan. 18, 1966

3,230,509
MULTIPLE CIRCUIT DATA TRANSMISSION CONTROL

Dana R. Spencer, Wappingers Falls, N.Y., assignor to International Business Machines Corporation, New York, N.Y., a corporation of New York Filed June 11, 1962, Ser. No. 201,598
4 Claims. (Cl. 340—167)

This invention relates to the transmission of data manifestations between various units of communication or data processing apparatus, and more particularly to means for the common control over the transmission of data to a plurality of data receiving means.

In the data processing and data communication arts, it is commonly known that data manifestations can be distributed from a single transmitter to a plurality of receivers by means of any number of well-known techniques of multiplexing. It is also commonly known that a plurality of devices may respond to common control from a single controlling means in a variety of ways. For instance, if a data transmitting device is capable of transmitting data from itself to various receiving means, the transmitter is most commonly operated in a cyclic fashion, wherein the signals representing data are caused to be manifested in a sequence having a general repetition rate. This is particularly true of machines wherein a plurality of signals are sent seriatim so as to represent a value, an alphabetic letter, or any other character. In such devices certain control-responsive occurrences must be monitored to determine the correct time to start transmitting, and to perform certain functions after transmission has been completed.

For example, in a machine in which each character of data is transmitted by being shifted serially, bit by bit, out of a standard shift register, the shift register itself receiving data from different storage locations of a related memory apparatus, it is necessary to identify the proper time, within a sequence of operations, when the shift register is to be loaded from the different storage locations. This may be done (as discussed more fully hereinafter) by a clocking means which cyclically generates a series of start signals that are separated by amounts of time approximately equal to the amount of time required for the shift register to shift out an entire character. Thus, any number of units which are serviced by the transmitter and shift register may be controlled by said clocking signal. However, if a single transmitter is servicing a plurality of receivers on a time division multiplex basis, a length of time between the beginning and the end of transmission of a given character to a particular unit may be a substantially long time with respect to the operating times of the equipment involved. Therefore, a great deal of time may be lost while a unit which could be receiving data from the transmitter has to wait until the aforementioned start signal appears again. To overcome this, it would be possible to provide each of the receiving means with a timing circuit which would measure the length of time between the commencement of the transmission of a character and the completion thereof. However, this of course becomes extremely expensive, particularly where a large number of receiving units are involved.

It is, therefore, an object of this invention to provide an improved control means capable of controlling the start of data transmission to a plurality of receiving means.

Another object is to provide a multiple unit controlling means for controlling the initiation of a data transfer to a plurality of receiving means wherein an initial data transfer operation can be started at any one of a plurality of times in a machine cycle, while at the same time preventing the start of a data transfer to any of said receiving means while a data transfer to another one of said receiving means is in progress.

In accordance with the present invention, means are provided to selectively permit the initiation of a data transfer operation, said means being disabled once a data transfer operation is started, and again being enabled upon the completion of each data transfer operation. In this way, a data transmission operation can be started for any one receiving means, and other of the receiving means which thereafter desire service can be serviced along with said first means after the first means has transferred a single character, or other unit of data.

The invention avoids the necessity of having a controlling means for each receiving means, and at the same time avoids the necessity of any receiving means waiting until a particular time in a machine cycle in order for service to be initiated. Once service is started toward one of the receiving means, all other receiving means which are controlled by the same device can begin to be served at the start of any character following the one in which service is desired. If service is desired at a time when the controlling means is not servicing any of the units, service can begin instantaneously. Thus, a greater utilization of machine time is effected in the majority of cases. This is particularly advantageous in the case of a system wherein traffic is not heavy or continuous, but more sporadic. In these cases, each unit of traffic can be more expeditiously transferred than would be the case if service to each receiving means could be commenced only at a particular point in the cycle, without regard to the amount of traffic which had already been initiated as in the case of the prior art devices.

The foregoing and other objects, features and advantages of the invention will be apparent from the following more particular description of preferred embodiments thereof, as illustrated in the accompanying drawings.

Figure 1:
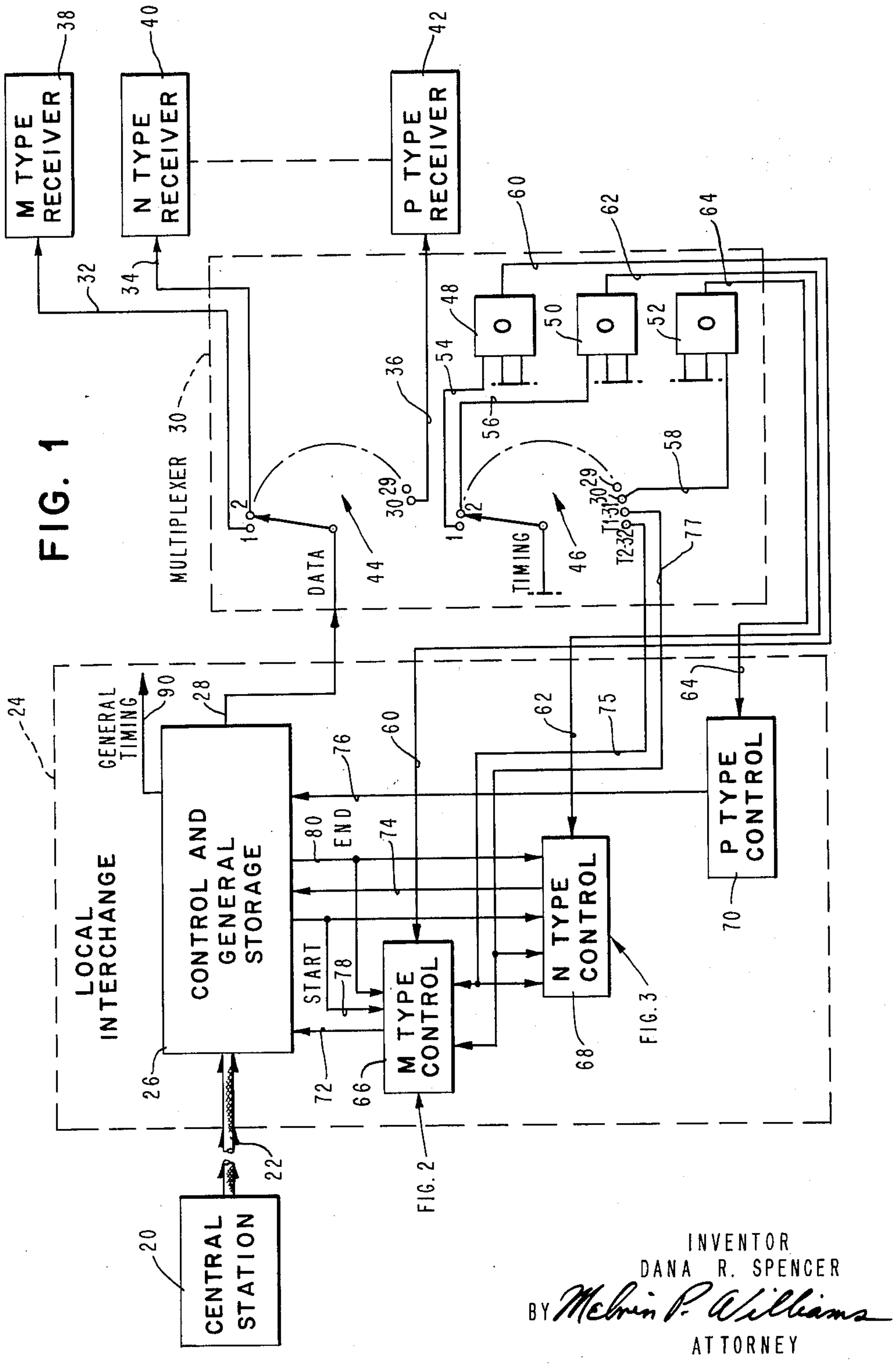
FIG. 1 is a schematic block diagram of a system of data communications which utilize the present invention.

Referring now to an embodiment of the invention shown in FIG. 1, a CENTRAL STATION 20, which is not a part of the subject invention, is adapted to send signals representative of data over a trunk of lines 22 to a local INTERCHANGE 24. The local INTERCHANGE 24 may comprise a main CONTROL AND GENERAL STORAGE section 26. Data which is temporarily stored in the CONTROL AND GENERAL STORAGE section 26 may thereafter be transferred in serial fashion over a line 28 to a MULTIPLEXER 30 for subsequent concurrent distribution over a plurality of lines 32, 34, 36 to corresponding RECEIVERS 38, 40, 42. The MULTIPLEXER 30 can be of any well-known type, and may include a DATA switch 44 for scanning the different lines 32, 34, 36, thereby distributing the data to the correct receivers as before described. The MULTIPLEXER 30 may also include, by way of example, a TIMING switch 46 for distributing timing pulses in synchronism with the distribution of data by the DATA switch 44. Specifically, the TIMING switch 46 has been shown in FIG. 1 to distribute timing pulses to OR circuits 48, 50, 52 over corresponding lines 54, 56, 58. The OR circuits 48, 50, 52 in turn pass the signals over corresponding lines 60, 62, 64 to related control circuits 66, 68, 70. The switch 46 also has two additional contacts for generating timing signals T1 and T2 over a pair of lines 75, 77, respectively, which lines are utilized to supervise the M and N TYPE CONTROL circuits 66 and 68, but not the P TYPE CONTROL circuit 70. The various CONTROL circuits 66, 68, 70 control the transfer of data from the CONTROL AND GENERAL STORAGE section 26 of the INTERCHANGE 24 by means of signals conducted over lines 72, 74 and 76. The M TYPE CONTROL 66 and N TYPE CONTROL 68 receive from the CONTROL AND GENERAL STORAGE unit 26 a character START control signal over a line 78 and a character END control signal over a line 80.

It is to be understood that the provision in a city or within a single building of a local interchange to handle the traffic to that city or building, respectively, provide a method whereby data may be transmitted from another city, either from a central station, or from any other interchange through a central station, and the information can be distributed locally in a very efficient manner by means of the local interchange. All of this is well known in the art and forms no part of the subject invention, but rather sets the stage within which the invention is framed.

Figure 2:
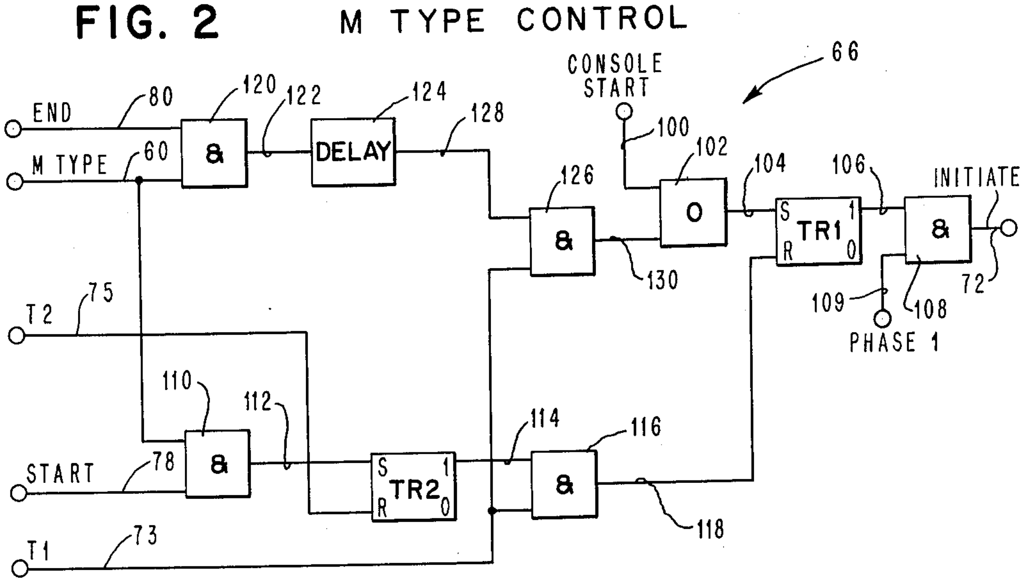
FIG. 2 is a schematic block diagram of a multiple circuit controlling means in accordance with the present invention, and embodiment shown therein being generic in nature.
Figure 3:
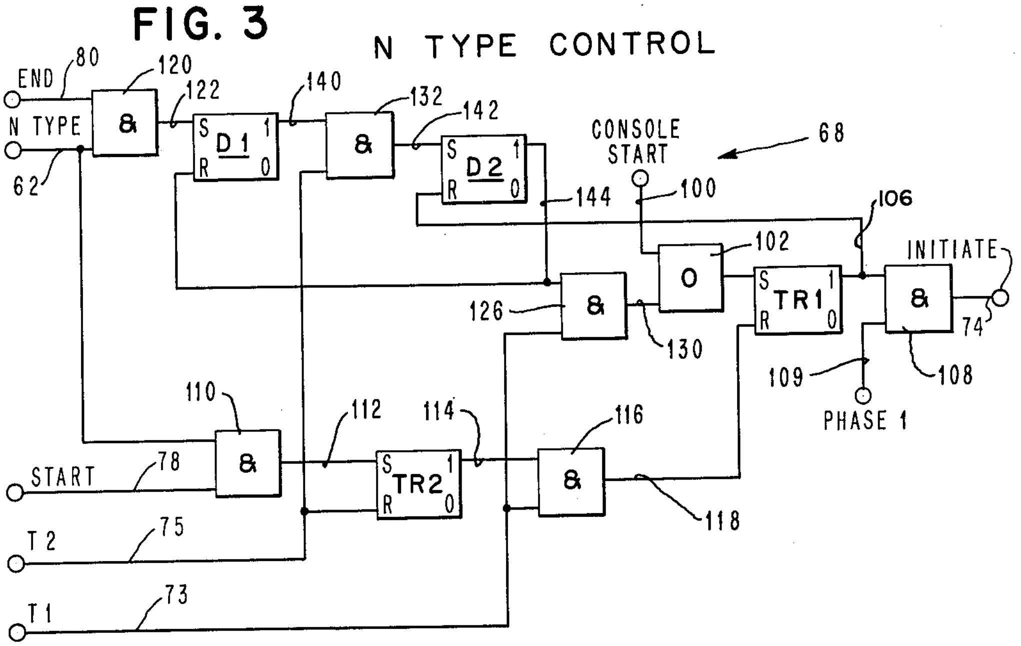
FIG. 3 is a schemtic block diagram of a specific example of the device shown in FIG. 2.

The subject invention resides in providing improved CONTROL circuits such as thise illustrated by the M TYPE CONTROL 66 (shown in detail in FIG. 2), and the more specific N TYPE CONTROL 68 (shown in detail in FIG. 3). The P TYPE CONTROL 70 will be described more fully hereinafter, and comprises one type of control known in the prior art.

In order to have the data in the CONTROL AND GENERAL STORAGE section 26 reach the individual receivers 38, 40, 42, the MULTIPLEXER 30 controls the sending of data over the single line 28, through the switch 44 to the appropriate receiver over respective input lines 32, 34, 36. As the DATA switch 44 scans the various receivers by stepping from one, to two, to three . . . to thirty, the TIMING switch 46 also steps from one to thirty in synchronism therewith. The TIMING switch, and other units of FIG. 1, may receive necessary clocking signals from the CONTROL AND GENERAL STORAGE section 26, as indicated by a GENERAL TIMING LINE 90, and as is within the skill of the art. Thus each time that the MULTIPLEXER 30 is connected to service a particular RECEIVER 38, 40, 42, one of the CONTROL circuits 66, 68, 70 will receive a signal over a corresponding line 60, 62, 64 indicating that it is now time to service a receiver which is of the same type as the particular control circuit. Although only three receivers are shown, it is to be understood that with a thirty-scan multiplexer, it is possible to service thirty units, and these may comprise units of several different types, the M, N and P types being shown by way of example only. Thus, the first, third, fourth, seventh, thirteenth and twenty-sixth scans may all be connected to M type receivers such as the M TYPE RECEIVER 38. Thus, the OR circuit 48 would be connected to the first, third, fourth, seventh, thirteenth and twenty-sixth positions of the TIMING switch 46 so that the M TYPE CONTROL 66 would receive a timing signal over the line 60 at each of these scan positions. Hence, if a data transmitting operation could be commenced to receivers of that type at this time, the M TYPE CONTROL 66 would provide an output on line 72 to permit data to be transmitted from the CONTROL AND GENERAL STORAGE section 26 over the line 28 through the DATA switch 44 to the particular M type receiver, such as the M TYPE RECEIVER 38 shown in FIG. 1. If the M TYPE CONTROL 66 does signal the CONTROL AND GENERAL STORAGE section 26 over line 72, then the first bit of a character will be read out over the line 28 toward the M TYPE RECEIVER 38. All of this happens nearly instantaneously, so that the DATA switch 44 will be still connected to the number 1 contact thereof. When the first bit is sent over the line 28, the CONTROL AND GENERAL STORAGE section 26 will send a character START signal back to the M TYPE CONTROL unit 66 over a line 78. This will cause the M TYPE CONTROL unit 66 to be put into a condition which will prevent any other character from being started out until the M TYPE CONTROL unit 66 receives a character END signal on line 80. Thus, all M type receivers will be caused to have the first bit of a character transmitted during the same scan. This being so, the single M TYPE CONTROL unit 66 can provide the necessary timing supervision over a plurality of M type receivers 38. All of this will be brought out more fully in connection with the description of FIGS. 2–4, hereinafter.

Referring now to FIG. 2, a general description of the control unit in accordance with the present invention follows. The exact nature of the timing signals, and the particular relationship with the embodiment shown in FIG. 1 will be more apparent after the description of the N type control unit shown in FIG. 3 which follows hereinafter. In FIG. 2, assuming that the circuit is completely at rest, when the system utilizing the circuit is started up for the first time, or at the beginning of a working day, or otherwise, a CONSOLE START SIGNAL may be supplied on a line 100 to an OR circuit 102, the output of which on line 104 sets a trigger TR1. The output of the trigger TR1 on line 106 is essentially the output of the M TYPE CONTROL circuit. In other words, this is the iterative factor which determines whether or not a particular M TYPE RECEIVER may have a data transmission initiated. However, the signal on line 106 is mixed in an AND circuit 108 with a PHASE 1 signal on a line 109 (the signal will be explained in detail hereinafter) so that there will be an INITIATE signal on line 72 only during a PHASE 1 signal which occurs after the trigger TR1 is turned ON. When the INITIATE signal appears on line 72, any data which is scheduled for an M type receiver unit may be sent out over the line 28 (FIG. 1) and the CONTROL AND GENERAL STORAGE section 26 will be sent a character START signal over line 78 (FIGS. 1 and 2) in response to sending the first bit of a character over the line 28. This is the indication to the M TYPE CONTROL unit 66 that the transmission of one character of data has begun, and that no other M type receivers can begin to be serviced until the completion of this character. Specifically, the character START signal on line 78 is fed to an AND circuit 110 which is gated by an M TYPE timing signal on the line 60 (from the OR circuit 48 in FIG. 1) to supply a setting signal to a trigger TR2 on a line 112. The setting of trigger TR2 applies a signal on line 114 that permits a T1 timing pulse on the line 73 to pass through an AND circuit 116 at the end of the scan within which the character was started out of the CONTROL AND GENERAL STORAGE section towards the M TYPE RECEIVER. The AND circuit 116 supplies a signal on a line 118 to reset trigger TR1, thus removing the signal 106 which in turn prevents the INITIATE signal from appearing on line 72. In this fashion, data transmissions to other M type receivers are prevented from starting after this time. Immediately thereafter, a T2 timing signal on line 75 resets the trigger TR2 thus enabling it for further operations later on. In other words, the trigger TR2 is used merely to reset the trigger TR1, whereas the trrigger TR1 is the main output from the M TYPE CONTROL unit 66. The enabling of the trigger TR1 will take place at the end of transmission of the particular character which caused TR2 to turn OFF trigger TR1. When the last bit of a character is sent out over the line 28 by the CONTROL AND GENERAL STORAGE section 26, a character END signal is also sent over a line 80 to the M and N TYPE CONTROL UNITS (FIG. 1). This signal (FIG. 2) is applied to an AND circuit 120, the output of which on line 122 is fed to a delay unit 124 which in turn controls an AND circuit 126 via a line 128. The AND circuit 126 permits a T1 timing signal on line 73 to send a signal over a line 130 to the OR circuit 102 to set the trigger TR1. Thus, when the character END signal is received on line 80, the trigger TR1 will be turned ON by a T1 timing pulse after some delay which is determined by the delay unit 124. This delay may be determined by the necessary timing relationship of any application of the subject invention, and may be as little as zero or as much as is consistent with any system configuration. However, due to the high speed nature of the circuits, it is believed that most applications will require at least a delay equal to some percentage of a scan of the MULTIPLEXER 30, or an even greater delay, as described below in connection with FIG. 3.

Figure 4:
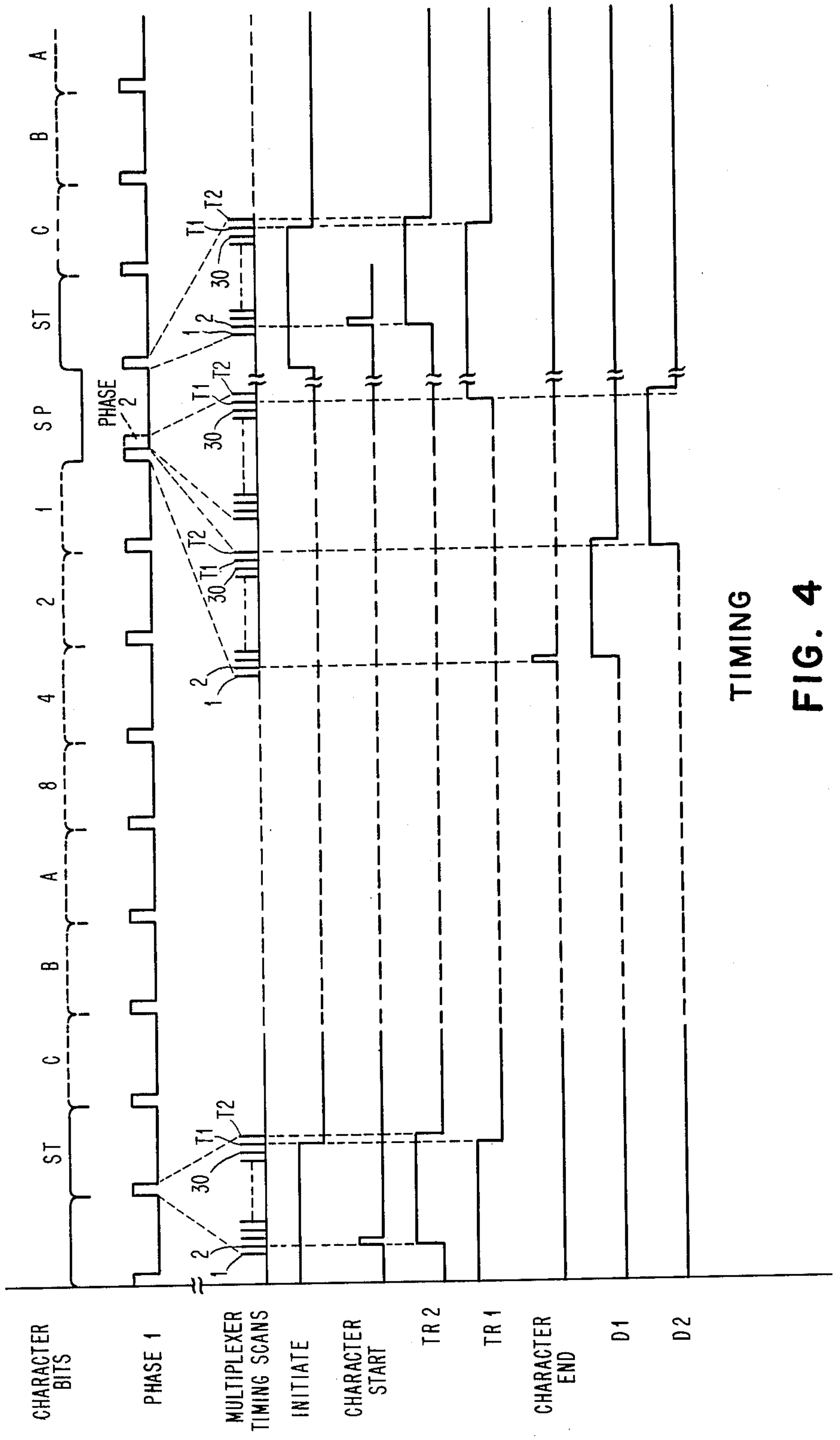
FIG. 4 is a timing diagram illustrating generally the timing signals of the kind utilized in the illustrative embodiments shown in FIGS. 1–3.

The following description of the N TYPE CONTROL unit 68 shown in FIG. 3 will tend to clarify the immediately preceding more general description of the M TYPE Control unit 66 shown in FIG. 2. In FIG. 3, the circuit is identical with that shown in FIG. 2 except that the delay unit 124 comprises a trigger D1, and AND circuit 132 and a trigger D2. The timing of signals which have been assumed for the specific embodiment shown in FIG. 3 is illustrated in the timing chart of FIG. 4. In FIG. 4, the top line illustrates data bits which may comprise a character. These are basically clock times during which the presence or absence of a signal on line 28 will manifest the presence or absence, respectively, of the indicated character bit. For instance, each character will begin with a start bit ST, and may also include any of the bits C, B, A, 8, 4, 2 and 1. The stop bit SP is always a zero, which in fact is a manifestation of the lack of any signals whatsoever. The timing is the assumed embodiment includes seven phases within each of the character bit times. The second waveform from the top illustrates phase 1. The use of seven different phase times within each bit is not necessary, and is merely one implementation of an over-all system timing scheme which has been found to be suitable. As will be illustrated in detail hereinafter, the use of the individual phases is made possible due to the fact that each character bit is significantly long compared to the operating time of a circuit in the embodiment being described. Furthermore, as shown to the right of the phase 1 waveform, it permits use of two different timings within each character bit for operating the various circuits, including the N TYPE CONTROL unit shown in FIG. 3. Within each phase, the MULTIPLEXER 30 will make a complete scan from one, to two . . . to thirty, to T1 and T2. Thus the first two waveforms of FIG. 4 are on a first scale, whereas the remaining waveforms are on an expanded scale. Referring now both to FIG. 3 and FIG. 4, assuming at the start of the timing chart in FIG. 4 that the INITIATE signal is present on line 74, when the MULTIPLEXER 30 scans to the number two position, the N TYPE RECEIVER 40 will be connected to the data line 28 by the DATA switch 44, and the TIMING switch 46 will send a signal over the line 56 to the OR circuit 50, over line 62 to the N TYPE CONTROL unit as shown in FIG. 1. More specifically, FIG. 3 shows a signal on line 62 being applied to the AND circuit 120 and the AND circuit 110. Since the INITIATE signal was present on line 74, the CONTROL AND GENERAL STORAGE section 26 (FIG. 1) will initiate a data transmission to the N TYPE RECEIVER, and, therefore, a character START signal is transmitted over line 78 to the N TYPE CONTROL 68, as seen in the fifth waveform from the top, FIG. 4. In FIG. 3, the character START signal on line 78, together with the signal on line 62 from the TIMING switch 46 (FIG. 1), causes the AND circuit 110 to send a signal over line 112 and thereby sets the trigger TR2, as shown in the sixth waveform from the top in FIG. 4. As seen in FIG. 4, as soon as the switches of the MULTIPLEXER reach the second position, a character START signal appears and causes trigger TR2 to be set. At this time, the actual start bit ST is send out over the line 28 (FIG. 1) toward the N TYPE RECEIVER. At the end of that scan, when the timing signal T1 appears on line 73, it passes through the AND circuit 116 which is gated by the output of trigger TR2 on line 114. The AND circuit output on line 118 resets trigger TR1 as shown in the fourth waveform from the bottom of FIG. 4. Immediately thereafter, the TIMING switch 46 (FIG. 1) is connected to the T2 segment and causes a T2 timing signal to appear on line 75 and reset trigger TR2 as shown in the FIG. 4. Thereafter, the CONTROL AND GENERAL STORAGE section 26 continues to send successive data bits over line 28 toward the N TYPE RECEIVER 40, as shown in FIG. 1. After the time for sending the "1" bit has expired, the data register or other means within the CONTROL AND GENERAL STORAGE section 26 will designate the stop bit ST by some suitable means. Although not shown, one way of achieving this is to put a "1" in each bit position of a shift register: as data is shifted out one end of the register, "1's" are shifted into the other end. Thus, when all the data has been shifted out of the register, it will be filled with "1's." The presence of "1's" in every position of a shift register may be easily detected by a tree of AND circuits, the output of which may be utilized as the character END signal for application over line 80 to the AND circuit 120 as shown in FIG. 3. Thus, the phase 1 time of a stop bit for each character will witness the presence of a character END signal, as indicated by the third waveform from the bottom in FIG. 4. When this is received in the N type control unit, it causes the AND circuit 120 to set a trigger D1 over a line 122. This is indicated by the second waveform from the bottom in FIG. 4. After D1 is set, it will apply a signal over a line 140 to an AND circuit 132 which will pass a T2 timing signal on line 75 at the end of the phase 1 scan following the sensing of the character END signal. The output of AND circuit 132 on the line 142 will set a trigger D2, which in turn sends a signal over a line 144 to reset the trigger D1. The signal on line 144 also permits the AND circuit 126 to pass the following T1 timing signal, which will occur during phase 2 of the stop bit SP. Thus, the triggers D1 and D2 will permit the AND circuit 126 to pass a T1 timing signal to set the trigger TR1, thereby indicating that another character can be started toward any N type receiver. It is to be noted that the timing signal T1 passing through AND circuit 126 actually sets the trigger TR1, and that therefore the trigger TR1 is always set at the end of the second phase within the stop bit SP. Thus, the INITIATE signal on line 74 cannot be generated by the AND circuit 108 until at least the completion of the stop bit due to the fact that a phase 1 signal on line 109 is required. In summation, the N type control unit can be started by a signal on the console start line 100, and will be turned OFF by a character START signal from any N type unit. Thereafter, it will be turned ON again in response to any character END signal resulting from service to an N type unit.

Referring to FIG. 4, a control unit of the prior art type, of which the P type control unit shown in FIG. 1 may be an example, may comprise a clocking scheme wherein timing bits (which synchronize the character bits shown in the upper waveform of FIG. 4) are utilized to advance a ring or other counter, and which closes on itself and repeats after every nine bits. Thus, the first stage of such a counter could be utilized as a start signal such as that generally illustrated by the line 76 in FIG. 1. In such a device, it would be necessary for the P TYPE CONTROL unit 70 to be advanced to the particular position (such as the first position of a counter) before transmission could be effected by the CONTROL AND GENERAL STORAGE section 26 to any P type receiver. In contrast, the M TYPE CONTROL 66 and N TYPE CONTROL 68 stand ready to permit initiation of a data transmission at all times unless and until a transmission is initiated. Only then will the circuit operate to prevent any further transmission from starting until the completion of transmission of a complete character.

It should be understood to those skilled in the art that the embodiment disclosed is descriptive merely, and that other forms of systems could employ the control units in accordance with the subject invention which have merely been illustrated by the M TYPE CONTROL unit in FIG. 2 and the N TYPE CONTROL unit in FIG. 3. The only essential is that there be provided means responsive to the beginning of a data transmission to disable the control unit, and means responsive to the ending of a unit of data transmission to re-enable the unit. The amount or type of delay provided between the ending of data transmission and the restoration of operation of the control unit can be defined as necessary so as to suit the design expediency of any given application of the subject invention.

While the invention has been particularly shown and described with reference to preferred embodiments thereof, it will be understood by those skilled in the art that the foregoing and other changes in form and details may be made therein without department from the spirit and scope of the invention.

What is claimed is:

1. In an information handling machine of the type in which signal manifestations of characters are transmitted between different parts of the machine, each character comprising a plurality of data designating bit manifestations, character transmission being effected serially, bit by bit, said data bit manifestations including a start signal which appears at the commencing of the transfer of a group of data bit manifestations, and an end signal which indicates the end of transmission of said group; said machine providing select signals, a first timing signal, and a second timing signal subsequent to said first timing signal; a device for controlling the transfer of said data bit manifestations, comprising:

output means capable of assuming either one of two stable conditions, said means when in a first one of said conditions generating an output signal to indicate to said machine an order to commence the transfer of a data group;

delay means responsive to said end signal and to said second signal to generate a delayed signal a determinable time after the concurrence of said end signal and said second timing signal;

means responsive to said first timing signal and said delayed signal for causing said output means to assume said first condition;

and means responsive to said start signal and said first timing signal for causing said output means to assume the second one of said conditions.

2. The device described in claim 1, wherein said delay means comprises:

a first bistable device settable in a first state by said end signal;

and a second bistable device settable in a first state in response to said first bistable device being in said first state in concurrence with the appearance of said second timing signal, said first bistable device being reset out of said first state when said second bistable device is set into its first state, said second bistable device being reset out of said first state in response to said output signal, said second bistable device providing said delayed signal when in said first state.

3. A data transmission control, comprising:

first and second AND circuits responsive to a selecting signal, said first AND circuit also responsive to a start signal, said second AND signal responsive to an end signal;

delay means responsive to said second AND circuit;

a third AND circuit responsive to said delay means and to a first timing signal;

a bistable output means;

means responsive to said third AND circuit for setting said bistable output means into a first one of its states, said means when in said first state generating an output signal comprising the output of said data transmission control;

a bistable output resetting means responsive to said first AND circuit to assume a first state, said bistable output resetting means being reset out of its first state by a second timing signal subsequent to said first timing signal;

and a fourth AND circuit responsive to said bistable resetting means and to said first timing signal to reset said first bistable device out of said state.

4. The device described in claim 3 wherein said delay means comprises:

a first bistable device settable in a first state by said end signal;

and a second bistable device settable in a first state in response to said first bistable device being in said first state in concurrence with the appearance of said second timing signal, said first bistable device being reset out of said first state when said second bistable device is set into its first state, said second bistable device being reset out of said first state in response to said output signal, said second bistable device providing said delayed signal when in said first state.

References Cited by the Examiner

UNITED STATES PATENTS

| | | | |
|---|---|---|---|
| 2,805,279 | 9/1957 | Walker et al. | 173—53 XR |
| 2,842,616 | 7/1958 | Snijders | 178—53.1 |
| 2,905,760 | 9/1959 | Walker et al. | 178–50 |
| 2,945,093 | 7/1960 | Paul et al. | 178—53.1 |

NEIL C. REID, *Primary Examiner.*